United States Patent [19]
Hung

[11] Patent Number: 5,971,548
[45] Date of Patent: Oct. 26, 1999

[54] MONITOR FILTER

[76] Inventor: Teng-Shun Hung, P.O. Box 82-144, Taipei, Taiwan

[21] Appl. No.: 09/122,856

[22] Filed: Jul. 28, 1998

[51] Int. Cl.[6] .............................. G02B 27/00; G02B 5/08
[52] U.S. Cl. .......................... 359/609; 359/601; 359/608
[58] Field of Search .................................... 359/601, 609, 359/613–614, 808, 811, 819; 348/834–842; 248/295.11, 442.2, 918, 489, 205.3

[56] References Cited

U.S. PATENT DOCUMENTS

| | | | |
|---|---|---|---|
| 5,227,916 | 7/1993 | Theirl et al. ............................. | 359/609 |
| 5,404,181 | 4/1995 | Hung ........................................ | 348/834 |
| 5,448,405 | 9/1995 | Clausen et al. .......................... | 359/609 |
| 5,797,570 | 8/1998 | Dolan et al. ............................. | 359/609 |

*Primary Examiner*—Thong Nguyen
*Attorney, Agent, or Firm*—A & J

[57] ABSTRACT

A monitor filter includes a rectangular frame having cover, a pair of adjusting knobs fitted in two recesses formed close to two upper corners of the rectangular frame, and a pair of arms each having a bottom provided with a soft pad and a downwardly extending screw engaged with a respective one of the adjusting knobs, whereby the monitor filter can be easily and rapidly adjusted in position.

3 Claims, 4 Drawing Sheets

MONITOR FILTER

BACKGROUND OF THE INVENTION

1. Field of the Invention

This invention is related to a monitor filter and in particular to one which can be easily and rapidly adjusted in position.

2. Description of the Prior Art

During recent years, evidence of video display terminal related illnesses has surfaced and an increasing number of health complaints have been reported. The glare and the reflection will damage the eyesight while the static induction will hurt both the eyesight and the face skin of the operator. Hence, a number of monitor filters have been developed to reduce glare, reflection and static induction. However, the commonly used monitor filter on the market only utilizes a pair of straps provided with a hook at the free end to be suspended from the top of a monitor and the straps will become loose after a certain period of time thereby making it necessary to re-adjust the straps and therefore causing much inconvenience in use. Another commonly used monitor filter utilizes a pair of fixed arms to be suspended from the top of a monitor, but it is impossible to adjust the position of the monitor filter hence making it unfit for practical use.

Therefore, it is an object of the present invention to provide an improved monitor filter which can obviate and mitigate the above-mentioned drawback.

SUMMARY OF THE INVENTION

This invention is related to an improved monitor filter.

According a preferred embodiment of the present invention, a monitor filter includes a rectangular frame having a first cover and a second cover engaged with the first cover, a pair of adjusting knobs fitted in two recesses formed close to two upper corners of the rectangular frame, and a pair of arms each having a bottom provided with a soft pad and a downwardly extending screw engaged with a respective one of the adjusting knobs, whereby the monitor filter can be easily and rapidly adjusted in position.

It is the primary object of the present invention to provide a monitor filter which can be easily and rapidly adjusted in position.

It is another object of the present invention to provide a monitor filter which can be firmly mounted on a monitor.

It is still another object of the present invention to provide a monitor filter which is convenient to use.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

BRIEF DESCRIPTION OF THE DRAWINGS

FIG. 2A is an enlarged fragmentary view of the portion A of FIG. 2;

FIG. 2B is an enlarged fragmentary view of the portion B of FIG. 2;

FIG. 2C is an enlarged exploded view of the arm;

DETAILED DESCRIPTION OF THE PREFERRED EMBODIMENT

Figure 1:
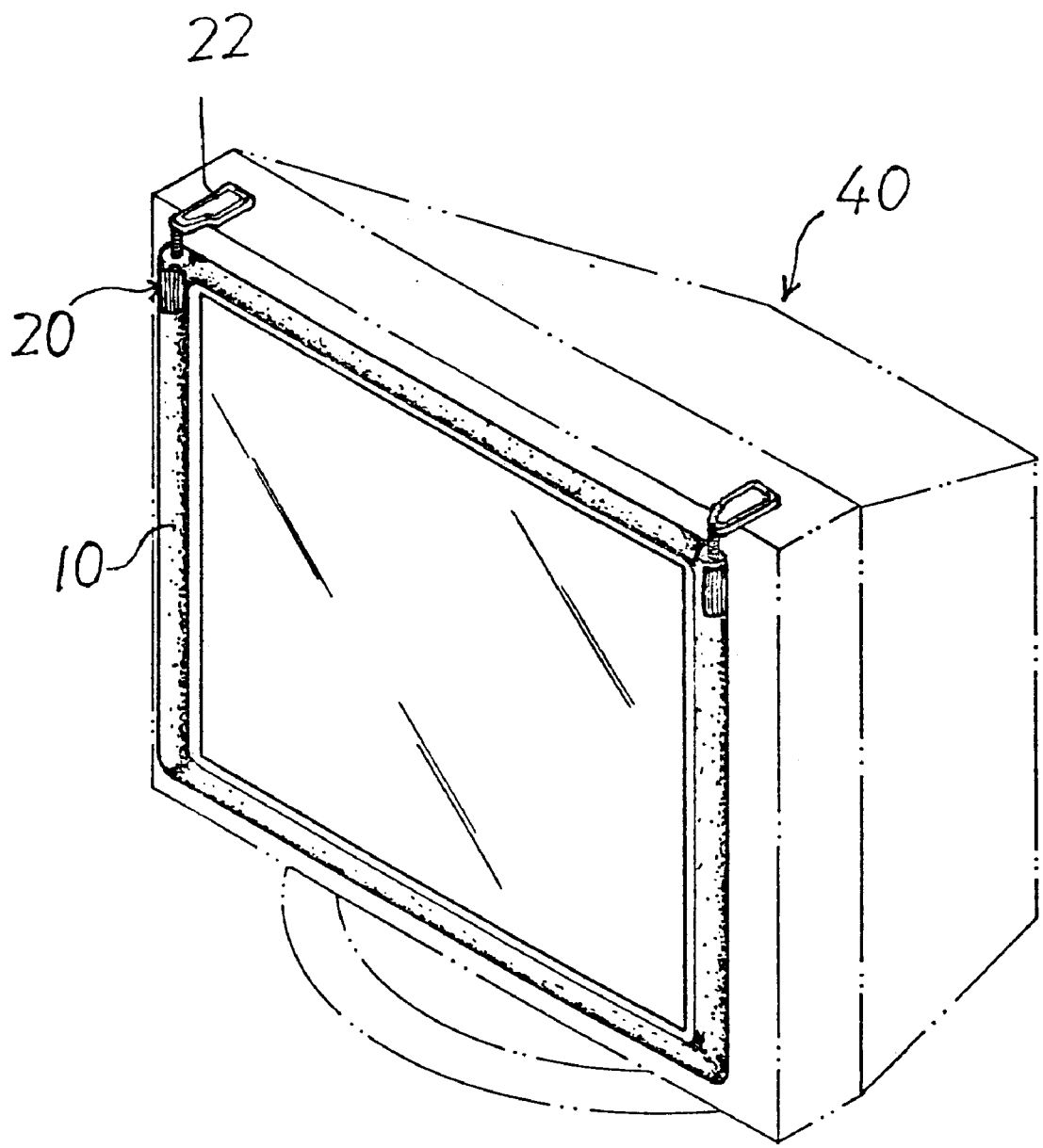
FIG. 1 is a perspective view of the present invention.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

With reference to drawings and in particular to FIG. 1 thereof, the monitor filter according to the present invention generally comprises a rectangular frame 10, a pair of arms 22 and a pair of adjusting knobs 20.

Figure 2:
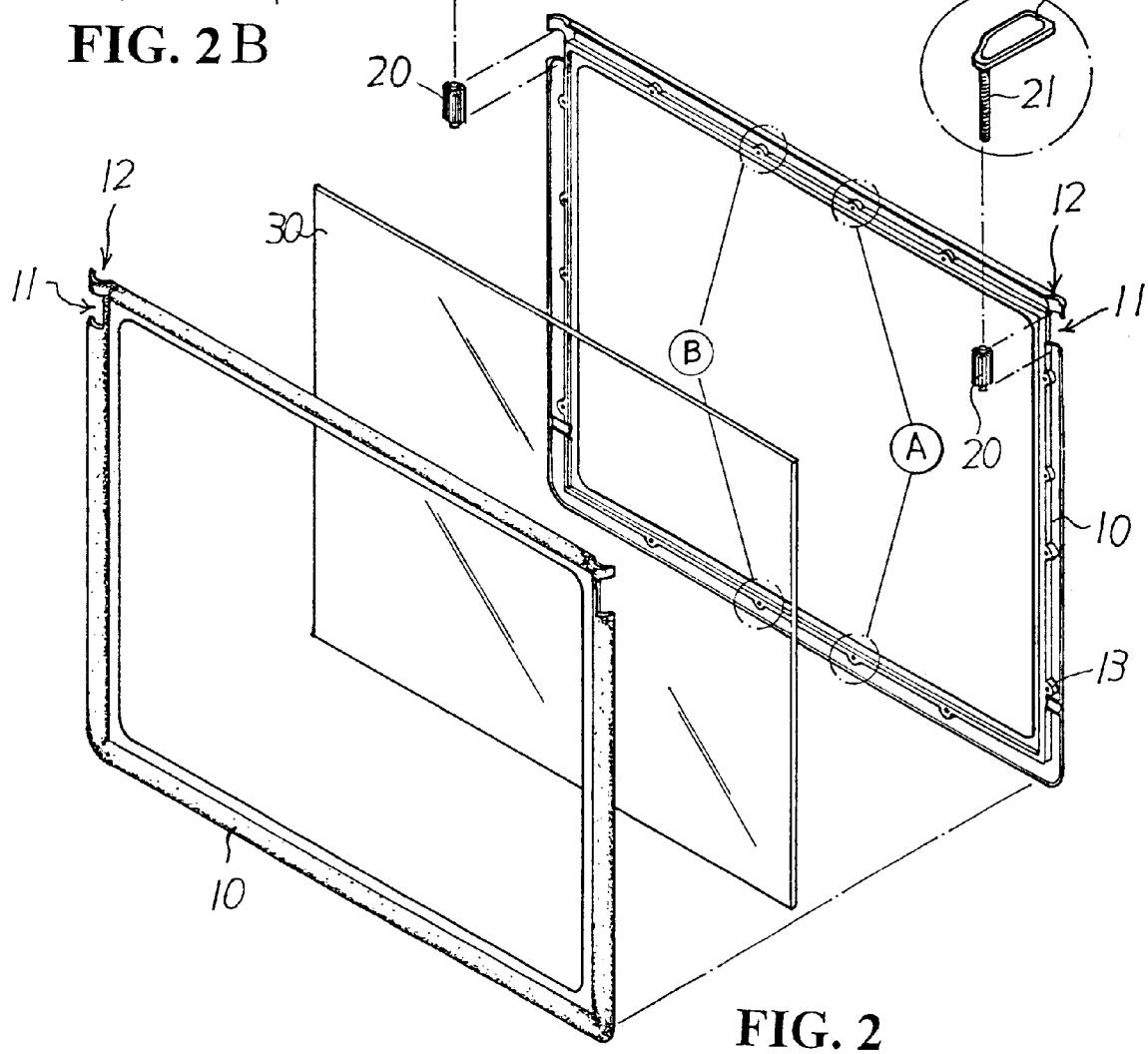
FIG. 2 is an exploded view of the present invention.
Figure 3:
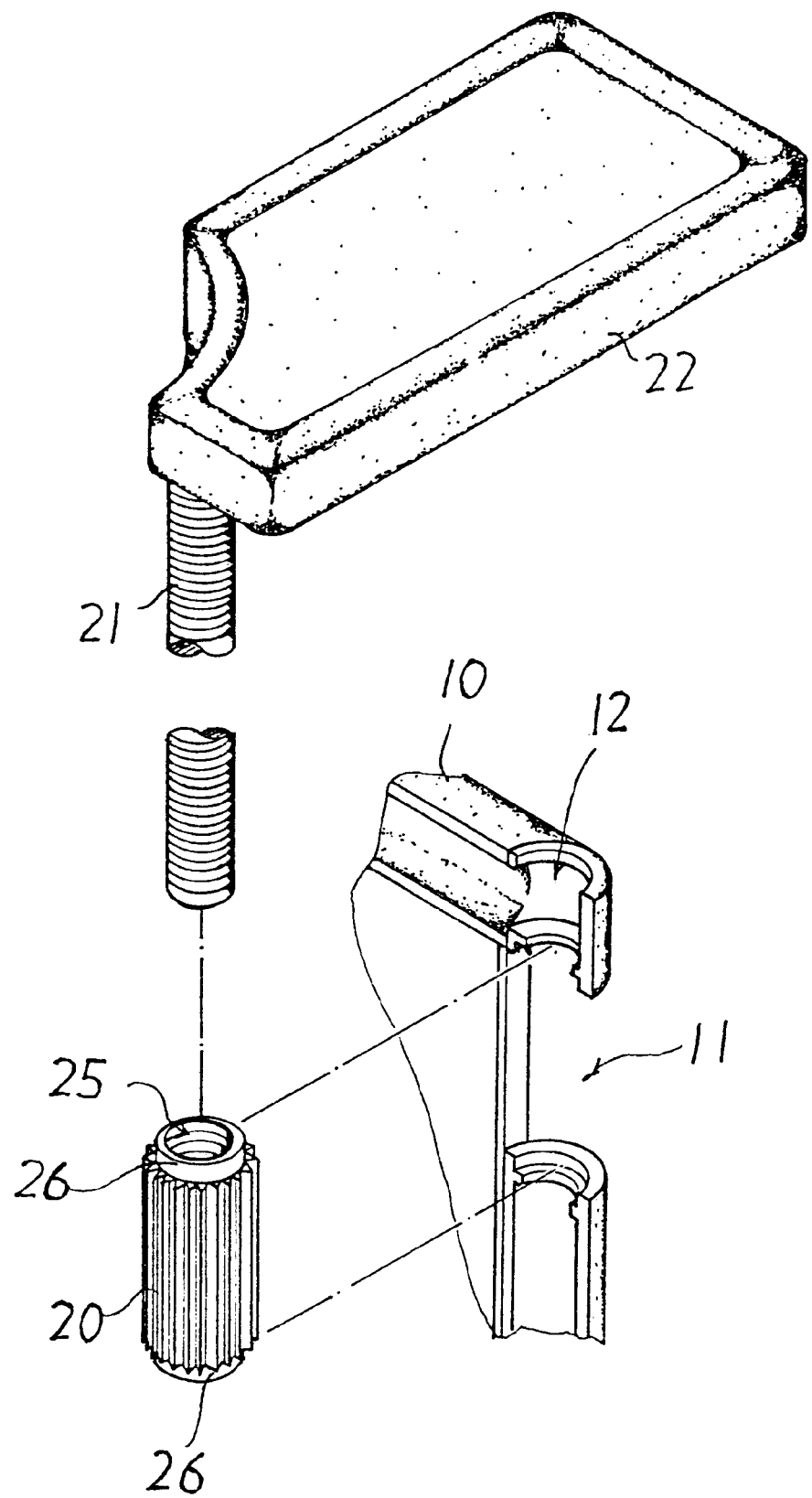
FIG. 3 is an enlarged view illustrating the relationship between the arm, the adjusting knob and the frame.

The rectangular frame 10 is composed of an outer cover, an inner cover and an anti-radiation screen 30. The outer cover is symmetric with the inner cover in structure. The inner side of the outer cover has a plurality of lugs 13 alternatively formed with protuberances 14 (see FIG. 2A) and holes 15 (see FIG. 2B), while the outer side of the inner cover has a plurality of lugs formed with corresponding protuberances and holes (not shown) adapted to engaged with the holes 15 and protuberances 14 of the outer cover. The anti-radiation screen 30 is fitted between the outer and inner covers.

Each of the outer and inner covers of the rectangular frame 10 is formed with two semi-cylindrical passages at two vertical sides thereof such that the rectangular frame 10 will have two vertical cylindrical passages 12 extending vertically through two opposite sides thereof when the inner and outer covers are joined together. Each of the cylindrical passages 12 is formed with a recess 11 in which is fitted the adjusting knob 20. The adjusting knob 20 is a tubular member having an axial threaded through hole 25 and has an outer diameter larger than the inner diameter of the cylindrical passage 12. The upper and lower ends of the adjusting knob 20 are each formed with a neck 26 having a smaller diameter than the cylindrical passage 12 so that the adjusting knob 20 can be fitted in the recess 11 with its necks 26 fitted into the cylindrical passage 12. The outer surface of the adjusting knob 20 has a plurality of longitudinal raised lines for facilitating the rotation thereof. The arm 22 is provided with a soft pad 23 (see FIG. 2C) at the bottom and a downwardly depending screw 21 at the corner. The screw 21 of the arm 22 is fitted into the cylindrical passage 12 of the rectangular frame 10 to engage with the threaded hole 25 of the adjusting knob 20.

In assembly, the outer cover is engaged with the inner cover to form the rectangular frame 10, with the anti-radiation screen 30 fitted therebetween. Then, the two adjusting knobs 20 are fitted into the recesses 11 of the rectangular frame 10. Thereafter, the two arms 22 are mounted on two upper corners of the rectangular frame 10, with the screws 21 extending through the cylindrical passages 12 to engage with the adjusting knobs 20. Hence, when the adjusting knobs 20 is rotated, the arms 22 will be moved up or down depending on the direction that the adjusting knobs 20 are turned. As shown in FIG. 1, when in use, the two arms 22 are arranged on the top of the monitor 40 and then the adjusting knobs 20 are tuned to adjust the position of the monitor filter so that the monitor filter is just mounted in front of the monitor 40".

Figure 4:
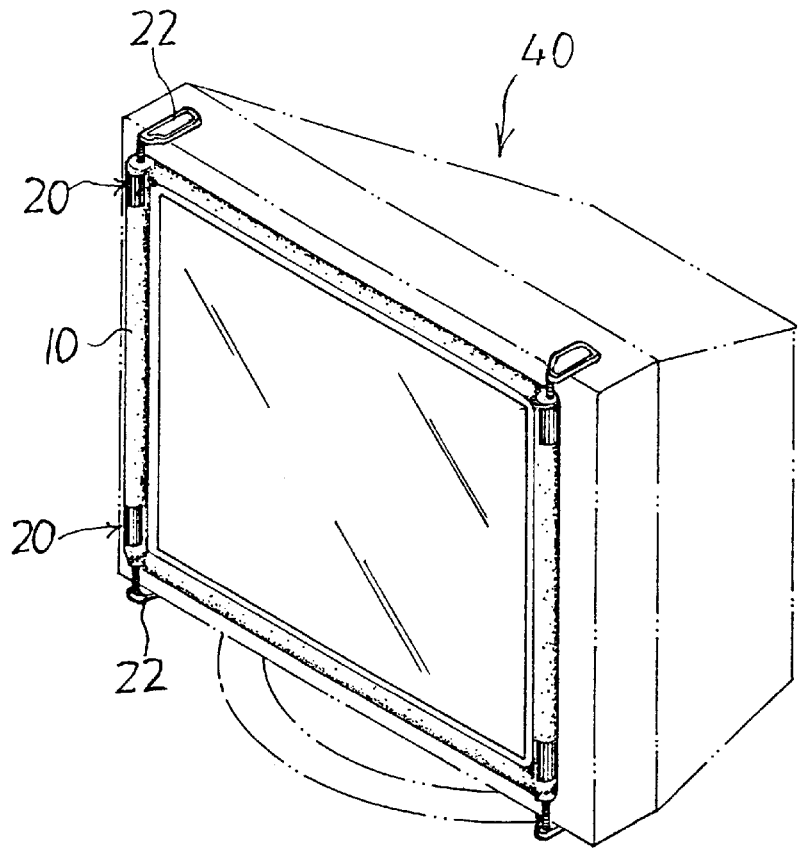
FIG. 4 illustrates a second preferred embodiment according to the present invention.
Figure 5:
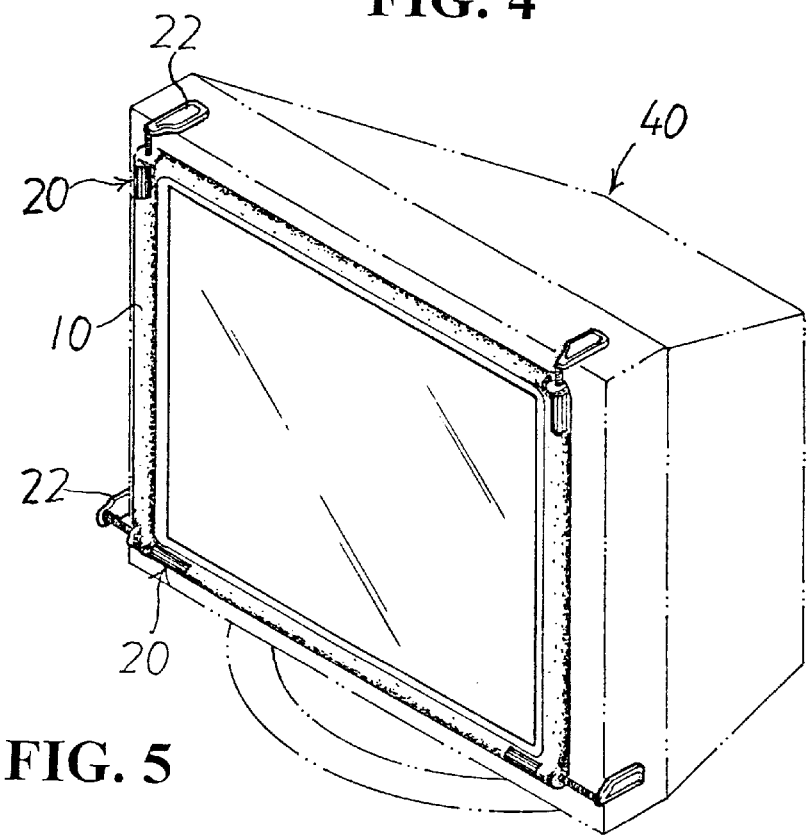
FIG. 5 illustrates a third preferred embodiment according to the present invention.

FIG. 4 illustrates a second preferred embodiment according to the present invention. As shown, the lower corners of the rectangular frame 10 are each provided with an adjusting knob 20 so that the monitor filter can be firmly mounted on the monitor 40. FIG. 5 illustrates a third preferred embodiment according to the present invention. As illustrated, the rectangular frame 10 is provided with two adjusting knobs 20 which are horizontally arranged at two lower corners thereof so as to be adapted for use with a monitor having a lower edge not suitable for mounting.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

I claim:

1. A monitor filter comprising:

a rectangular frame including a first cover and a second cover engaged with said first cover, said first and second covers being of symmetric structure, said first and second covers being formed with two semi-cylindrical passages at two vertical sides thereof such that said rectangular frame will have two vertical cylindrical passages when said first and second covers are joined together, each of said semi-cylindrical passages being formed with a recess close to an upper end thereof;

an anti-radiation screen fitted between said first and second covers;

a pair of adjusting knobs each fitted in a respective recess and having an axial threaded through hole; and a pair of arms each having a bottom provided with a soft pad and a downwardly extending screw engaged with said axial threaded through hole;

whereby when in use, said two arms are arranged on a top of a monitor and then said adjusting knobs are turned to adjust position of said monitor filter so that said monitor filter is just mounted in front of said monitor.

2. The monitor filter as claimed in claim 1, further comprising a second pair of adjusting knobs each having an axial threaded through hole, and a second pair of arms each having a bottom provided with a soft pad and a downwardly extending screw engaged with said axial threaded through hole, and each of said semi-cylindrical passages being formed with a recess close to a lower end thereof in which is fitted a respective adjusting knob.

3. The monitor filter as claimed in claim 1, further comprising a second pair of adjusting knobs each having an axial threaded through hole, and a second pair of arms each having a bottom provided with a soft pad and a downwardly extending screw engaged with said axial threaded through hole, and said rectangular frame has a cylindrical passage at a lower side thereof formed with two recesses in which are fitted said second pair of adjusting knobs.

\* \* \* \* \*